US010747006B2

(12) United States Patent
Gwalani et al.

(10) Patent No.: US 10,747,006 B2
(45) Date of Patent: Aug. 18, 2020

(54) HEADS UP DISPLAY SYSTEM FOR USE WITH HELMETS (71) Applicant: MANGO TEQ LIMITED, Auckland Central, Auckland (NZ)

(72) Inventors: Kunal Chaturbhuj Gwalani, Auckland (NZ); Jens Steinigen, Auckland (NZ)

(73) Assignee: MANGO TEQ LIMITED, Auckland Central, Auckland (NZ)

( * ) Notice: Subject to any disclaimer, the term of this patent is extended or adjusted under 35 U.S.C. 154(b) by 0 days.

(21) Appl. No.: 16/474,207

(22) PCT Filed: Dec. 22, 2017

(86) PCT No.: PCT/NZ2017/050173
§ 371 (c)(1),
(2) Date: Jun. 27, 2019

(87) PCT Pub. No.: WO2018/124885
PCT Pub. Date: Jul. 5, 2018

(65) Prior Publication Data
US 2019/0353910 A1 Nov. 21, 2019

(30) Foreign Application Priority Data

Dec. 29, 2016 (NZ) ........................................ 727979

(51) Int. Cl.
*G09G 5/00* (2006.01)
*G02B 27/01* (2006.01)
(Continued)

(52) U.S. Cl.
CPC ..... *G02B 27/0176* (2013.01); *G02B 27/0172* (2013.01); *A42B 3/042* (2013.01);
(Continued)

(58) Field of Classification Search
CPC .......... G06F 3/011; G06F 3/012; G06F 3/013; G06F 3/014; G02B 27/017; G02B 7/12
See application file for complete search history.

(56) References Cited

U.S. PATENT DOCUMENTS 6,285,373 B1    9/2001  Baldwin et al.
8,120,857 B2 *  2/2012  Hedges .................... A42B 3/04
                                                    345/7

(Continued)

FOREIGN PATENT DOCUMENTS

KR    20-0335724 Y1   12/2003
KR    10-1252483 B1    4/2013

OTHER PUBLICATIONS

International Search Report for corresponding PCT International Application No. PCT/NZ2017/050173, dated Nov. 20, 2018.

*Primary Examiner* — Vijay Shankar
(74) *Attorney, Agent, or Firm* — Pepper Hamilton LLP (57) ABSTRACT A HUD system for external attachment to a helmet. The system has an enclosure adapted to house a graphics processing unit, communications device and an optical system for generating the HUD display. The optical system has a display and a light guide adapted to guide light from the display from an input to an output where the HUD is presented in the view of the helmet user. The input of the light guide is located internal to the enclosure and the output of the light guide is located external to the enclosure.

21 Claims, 4 Drawing Sheets (51) Int. Cl.
  *A42B 3/04*  (2006.01)
  *G02B 27/00*  (2006.01)
(52) U.S. Cl.
  CPC .... *G02B 27/0037* (2013.01); *G02B 2027/014* (2013.01); *G02B 2027/0169* (2013.01); *G02B 2027/0187* (2013.01)

(56) References Cited

U.S. PATENT DOCUMENTS

| | | | |
|---|---|---|---|
| 9,565,885 B2 * | 2/2017 | Hedges | A42B 3/04 |
| 2010/0091377 A1 | 4/2010 | Hedges et al. | |
| 2012/0120482 A1 * | 5/2012 | Hedges | A42B 3/04 |
| | | | 359/353 |
| 2016/0107572 A1 * | 4/2016 | Weller | B60R 1/00 |
| | | | 348/36 |
| 2016/0110615 A1 | 4/2016 | Weller et al. | |

* cited by examiner

HEADS UP DISPLAY SYSTEM FOR USE WITH HELMETS

This application is a national stage application under 35 U.S.C. § 371 of PCT International Application Serial No. PCT/NZ2017/050173, filed Dec. 22, 2017, which claims priority benefit of New Zealand Application No. 727979, filed Dec. 29, 2016.

FIELD OF THE INVENTION

The invention relates to a heads up display system and in particular to an external heads up display system for use with helmets.

BACKGROUND

In the technology field of heads up displays for use with helmets, the heads up display optics and electronics for supporting the display are integrated within the helmet structure. For example, U.S. Pat. No. 9,247,779 describes a helmet having a heads up display, power source and sensors integrated within the shell of the helmet.

However, a helmet with an integrated heads up display system has a potential disadvantage of requiring a person to purchase a helmet specifically incorporating the heads up display and supporting electronics. Helmet users are known to often have specific requirements when selecting a helmet, including the form, size, comfort, features and brand allegiance. A helmet with an integrated heads up display system often do not meet other requirements of the user.

It is an object of the invention to go at least some way toward overcoming or at least ameliorating the one or more of the above mentioned problems or disadvantages, or which at least provides the public with a useful choice.

In this specification, where reference has been made to external sources of information, including patent specifications and other documents, this is generally for the purpose of providing a context for discussing the features of the present invention. Unless stated otherwise, reference to such sources of information is not to be construed, in any jurisdiction, as an admission that such sources of information are prior art or form part of the common general knowledge in the art.

SUMMARY OF THE INVENTION

Accordingly, in a first aspect there is a device for creating an image presented on a HUD external to a helmet, the system comprising:
   an enclosure adapted to house a graphics processing unit, communications device and an optical system,
   the optical system comprising a display and a light guide adapted to guide light from the display from an input to an output where the HUD is presented,
      wherein the input of the light guide is located internal to the enclosure and the output of the light guide is located external to the enclosure.

In some embodiments, the enclosure comprises a mechanism adapted to provide a releasable coupling of the enclosure to a helmet, the mechanism comprising a fastening surface and a resilient joint located between the fastening surface and the enclosure.

In some embodiments, the graphics processing unit comprises a controller and a storage unit, the storage unit configured to store a library of data representative of one or more images to be shown on the display, each image having an identification code associated therewith.

In some embodiments, the data representative of one or more images comprises pixel data representing an image of at least one icon and the location of that icon on the display.

In some embodiments, the image of an icon is an image data set representative of an image of navigation symbology.

In some embodiments, the controller is configured to:
   receive a signal representative of an identification code;
   retrieve data representative of an image associated from the receive identification code from the storage unit; and
   transmit the data to the display.

In some embodiments, the the identification code has less bandwidth for transmission than the image data for transmission to the display.

In some embodiments, the communications device is configured to wirelessly transmit and/or receive at least identification code data from a portable computing device.

In some embodiments, the optical system further comprises:
   a mirror positioned to capture light emitted from the display and reflect that light to a light guiding element;
   the light guiding element having a holographic optical element positioned so as to capture light from the mirror and reflect that light into the light guide; and
   a second holographic optical element positioned at an end of the light guide opposing the end where the first element is positioned, the second element configured to output an image for use as the HUD.

In some embodiments, the the optical system further comprises:
   the light guiding element having a holographic optical element positioned so as to capture light from the display and direct that light into the light guide; and
   a second holographic optical element positioned at an end of the light guide opposing the end where the first element is positioned, the second element configured to output an image for use as the HUD.

In some embodiments, the device further comprises a windshield located to at least partly encompass the output of the light guide.

In some embodiments, the windshield comprises an electrochromatic material operable to control the opacity of the windshield.

In some embodiments, the device further comprises a light intensity sensor configured to output a signal indicative of ambient light levels incident to the HUD, and the controller is further configured to output a signal operable to control the opacity of the electrochromatic material in response to the indicated ambient light level.

In another broad aspect there is a system for creating an image presented on a HUD external to a helmet, the system comprising:
   one or more sensors configured to output signals based on a variable;
   a portable computing device operable to receive the signals from the one or more signals; and
   a HUD device comprising:
      an enclosure adapted to house a graphics processing unit, communications device and an optical system,
      the optical system comprising a display and a light guide adapted to guide light from the display from an input to an output where the HUD is presented,
         wherein the input of the light guide is located internal to the enclosure and the output of the light guide is located external to the enclosure.

In some embodiments, the graphics processing unit of the HUD device comprises a controller and a storage unit, the storage unit configured to store a library of data representative of one or more images to be shown on the display, each image having an identification code associated therewith.

In some embodiments, the portable computing device is configured to determine an identification code associated with signals received from the one or more sensors.

In some embodiments, the portable computing device is configured to wirelessly transmit the identification code to the HUD device, and the controller is configured to:

receive a signal representative of an identification code;
retrieve data representative of an image associated from the receive identification code from the storage unit; and
transmit the data to the display.

In some embodiments, the identification code has less bandwidth for transmission than the image data for transmission to the display.

In some embodiments, the data representative of one or more images comprises pixel data representing an image of at least one icon and the location of that icon on the display.

In some embodiments, the image of an icon is an image data set representative of an image of navigation symbology.

In some embodiments, the HUD device further comprises a mechanism adapted to provide a releasable coupling of the enclosure to a helmet, the mechanism comprising a fastening surface and a resilient joint located between the fastening surface and the enclosure.

In some embodiments, the optical system further comprises:

a mirror positioned to capture light emitted from the display and reflect that light to a light guiding element;
the light guiding element having a holographic optical element positioned so as to capture light from the mirror and reflect that light into the light guide; and
a second holographic optical element positioned at an end of the light guide opposing the end where the first element is positioned, the second element configured to output an image for use as the HUD.

In some embodiments, the optical system comprises:

the light guiding element having a holographic optical element positioned so as to capture light from the display and direct that light into the light guide; and
a second holographic optical element positioned at an end of the light guide opposing the end where the first element is positioned, the second element configured to output an image for use as the HUD.

In some embodiments, the optical system further comprises a mirror positioned to capture light emitted from the display and reflect that light to a light guiding element.

In some embodiments, the HUD device further comprises a windshield located to at least partly encompass the output of the light guide.

In some embodiments, the windshield comprises an electrochromatic material operable to control the opacity of the windshield.

In some embodiments, the system further comprises a light intensity sensor configured to output a signal indicative of ambient light levels, and the portable computing device is further configured to output a signal operable to control the opacity of the electrochromatic material of the HUD device in response to the indicated ambient light level.

In another broad aspect there is a method of generating a visual display on a HUD device, the device comprising an enclosure adapted to house the graphics processing unit operable to generate graphics on a display, a storage unit configured to store a library containing a predetermined selection of graphical symbols, a communications device operable to receive signals indicative of a visual display for the HUD device from one or more devices external to the enclosure, and an optical system comprising a display operable to generate graphics by direction from the graphics processing unit and HUD optics arranged to generate a HUD; wherein the method comprises:

receiving, via the communications device, a signal representative of an identification code from the one or more devices external to the enclosure;
retrieving one or more predetermined graphical symbols from the storage unit associated with the received identification code; and
providing the one or more predetermined graphical symbols to the graphical processing unit; and
generating graphics on the display representative of the one or more predetermined graphical symbols.

In some embodiments, the one or more devices external to the enclosure comprises a portable computing device.

In some embodiments, the image of an icon is an image data set representative of an image of navigation symbology.

In some embodiments, the optical system further comprises:

a mirror positioned to capture light emitted from the display and reflect that light to a light guiding element;
the light guiding element having a holographic optical element positioned so as to capture light from the mirror and reflect that light into the light guide; and
a second holographic optical element positioned at an end of the light guide opposing the end where the first element is positioned, the second element configured to output an image for use as the HUD.

In some embodiments, the optical system comprises:

the light guiding element having a holographic optical element positioned so as to capture light from the display and direct that light into the light guide; and
a second holographic optical element positioned at an end of the light guide opposing the end where the first element is positioned, the second element configured to output an image for use as the HUD.

In another broad aspect there is a non-transitory computer readable medium storing a program causing a graphics processing unit to execute process causing a visual display on a HUD device, wherein the HUD device comprises an enclosure adapted to house the graphics processing unit operable to generate graphics on a display, a storage unit configured to store a library containing a predetermined selection of graphical symbols, a communications device operable to receive signals indicative of a visual display for the HUD device from one or more devices external to the enclosure, and an optical system comprising a display operable to generate graphics by direction from the graphics processing unit and HUD optics arranged to generate a HUD; wherein the process comprises:

receiving, via the communications device, a signal representative of an identification code from the one or more devices external to the enclosure;
retrieving one or more predetermined graphical symbols from the storage unit associated with the received identification code; and
providing the one or more predetermined graphical symbols to the graphical processing unit; and
generating graphics on the display representative of the one or more predetermined graphical symbols.

In some embodiments, the one or more devices external to the enclosure comprises a portable computing device.

In some embodiments, the image of an icon is an image data set representative of an image of navigation symbology.

In some embodiments, the optical system further comprises:
  a mirror positioned to capture light emitted from the display and reflect that light to a light guiding element;
  the light guiding element having a holographic optical element positioned so as to capture light from the mirror and reflect that light into the light guide; and
  a second holographic optical element positioned at an end of the light guide opposing the end where the first element is positioned, the second element configured to output an image for use as the HUD.

In some embodiments, the optical system comprises:
  the light guiding element having a holographic optical element positioned so as to capture light from the display and direct that light into the light guide; and
  a second holographic optical element positioned at an end of the light guide opposing the end where the first element is positioned, the second element configured to output an image for use as the HUD.

The following embodiments may relate to any of the above aspects. Other aspects of the invention may become apparent from the following description which is given by way of example only and with reference to the accompanying drawings.

As used in this specification, the term "and/or" means "and" or "or", or both.

As used herein, "computer-readable medium" excludes any transitory signals but includes any non-transitory data storage circuitry, e.g., buffers, cache, and queues, within transceivers of transitory signals.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

BRIEF DESCRIPTION OF THE DRAWINGS

The invention will now be described by way of example only and with reference to the drawings in which.

DETAILED DESCRIPTION

Reference will now be made in detail to embodiments of the invention, examples of which are illustrated in the accompanying drawings. Wherever possible, the same reference numbers are used in the drawings and the description to refer to the same or like parts.

Embodiments of the invention relate to a heads up display (HUD) system that can be mounted externally to a helmet, and thus offer the advantage of a user being able to select any helmet of their choosing for use with the HUD system. The helmet may be in use, for example, as a motorcycle or motorsports crash helmet. However, in other examples the helmet may be applicable for any activity including, but not limited to, cycling, skateboarding, snowboarding, surfing, skiing, climbing, paragliding, skydiving or rollerblading.

Mounting an HUD system externally to a helmet produces significant challenges when compared to a helmet integrated HUD system. For example, challenges of an externally mounted HUD system include consideration of how the HUD system is securely attached to a helmet, aerodynamic performance and wind resistance, resilience to impacts or knocks, sizing for adequate visibility, weight so as not to cause any unwanted loading on a user's neck, a power source and other control electronics for operating the display. Further, there are operational difficulties to be considered including protecting the HUD from environmental elements such as rain resistance, UV stability and visibility in ambient light.

Figure 1:
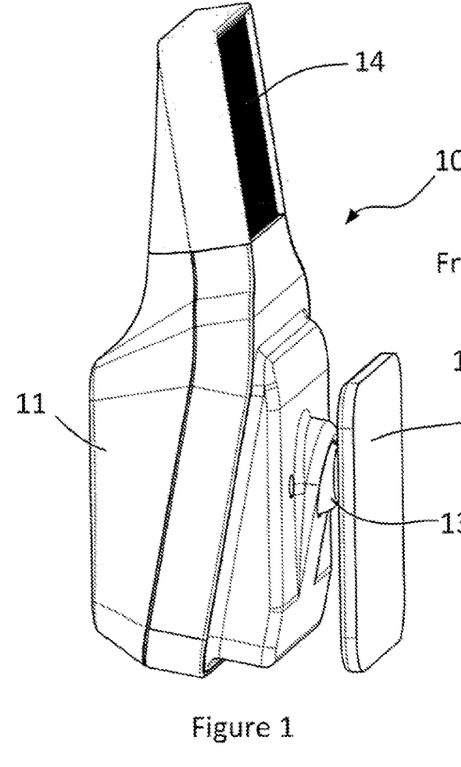
FIG. 1 illustrates a rear perspective view of one exemplary embodiment of an externally mounted HUD.
Figure 2:
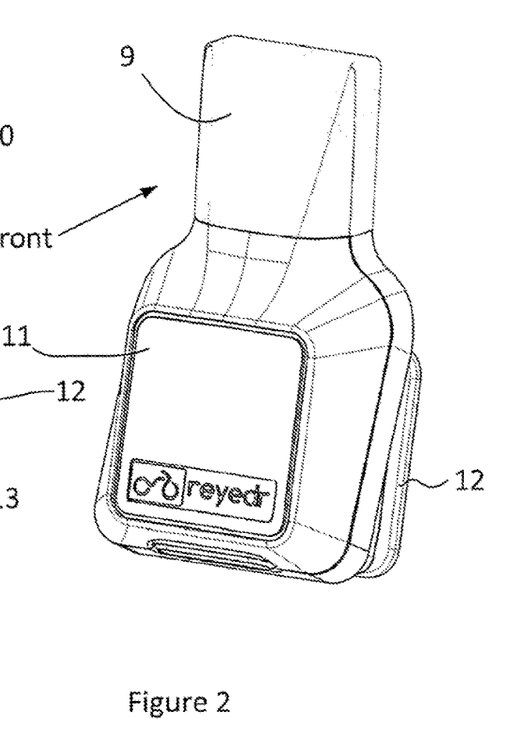
FIG. 2 illustrates a front perspective view of one exemplary embodiment of an externally mounted HUD.

FIG. 1 and FIG. 2 illustrate perspective views of one exemplary embodiment of an externally mounted HUD 10. The electronics and optics for providing the HUD are housing within an enclosure 11 and windshield 9 which acts as a protective barrier. To fasten the enclosure 11 to a helmet, a fastening surface 12 is provided. In some embodiments, the fastening surface may incorporate an adhesive, and in other embodiments may include a mounting lug or fastening device such as a screw or some combination thereof. In some embodiments, the fastening surface includes a curvature to match or closely represent mounting to contoured surfaces such as the chin bar of a full face style helmet.

The fastening surface 12 is optionally coupled to the enclosure 11 by a resilient ball joint that allows the pitch and roll angle of the enclosure to be adjusted by a user, yet will maintain its set position during everyday use.

In some embodiments, the fastening surface 12 and/or joint 12 is able to be decoupled, thereby allowing the enclosure to be removed from a helmet to which it is attached. Coupling and decoupling of the enclosure allows the HUD to potentially be used with two or more different helmets that a person or team may operate.

Protruding from the top section of the enclosure 11 is a transparent optical element 14 which provides display surface visible to a helmet user. The optical element 14 extends from a visible region at the top of the enclosure down into the body of the enclosure where light is coupled from an electronic display.

The windshield 9 extends from the enclosure 11, surrounding the optical element 14. The windshield 9 protects the optical element 14 from external influences, like impact of dirt particles, insects or mechanical forces, which may scratch or otherwise damage the optics.

In some embodiments, the windshield 9 is tinted by a photochromic coating reactive to surrounding light, or an electrochromic coating that reacts to electrical current or an electromagnetic field. Electrochromic tinting can be regulated through the power of the electromagnetic field or the power of the applied current. Electrical control of the tinting response enables a fine-tuned amount of opacity proportional to the surrounding light, sensed by the brightness sensor or as manually configured by a user.

Figure 3:
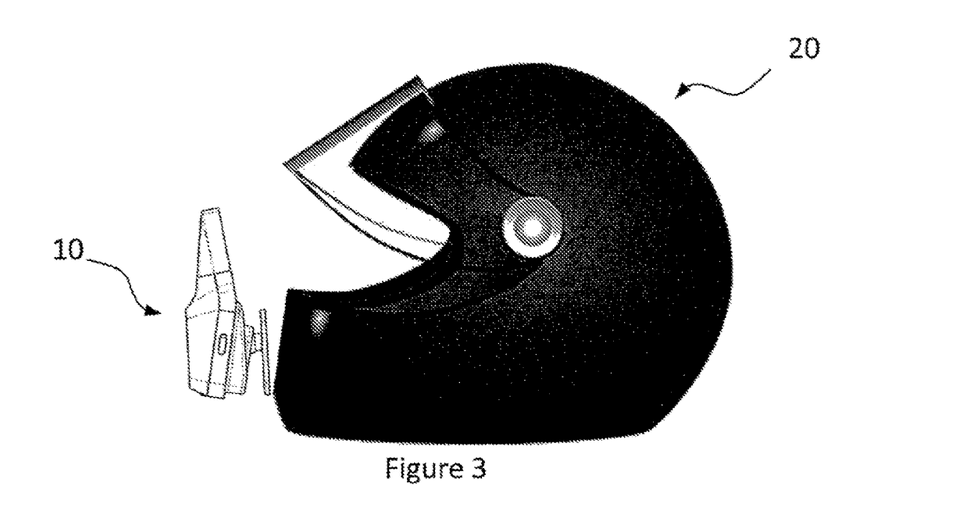
FIG. 3 shows an example of an external HUD mounted to the chin bar or a helmet.

FIG. 3 shows an example of the HUD 10 mounted to the chin bar or a helmet 20. In the example shown, the HUD 10 is fixed through a click-and-release mechanism. The mount attaches to the HUDs back side via a ball-mount with fastener to ensure 3-dimensional adjustment, but staying in position once adjusted properly. The click-and-release mechanism connects to a customised plate for each shape of helmet chin bar. The plate will be affixed to the chin bar with high potency adhesive tape. The shape of the customised plate is closely matched to the shape of the helmets 20 chin bar. There will be standard plates for most helmet shapes. It is envisaged that for special helmet shapes, custom plates can be 3D-printed per order from templates in an online shop. The templates could be from crowd-sourced 3D scans or manufacturer provided data.

Figure 4:
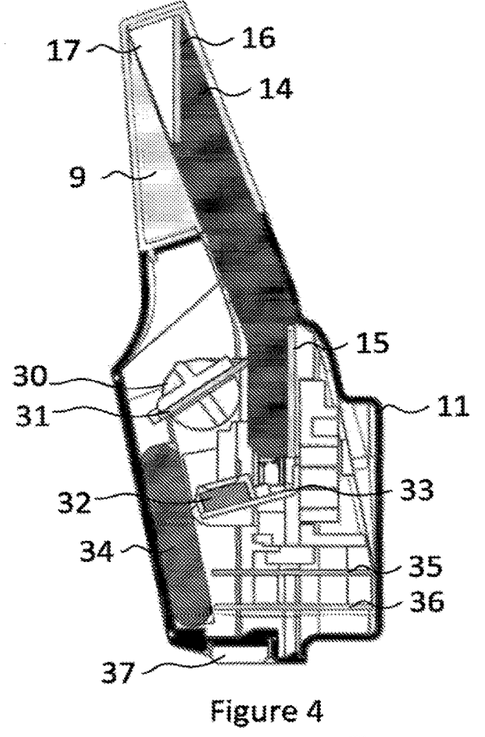
FIG. 4 shows a diagram of components internal to the enclosure.
Figure 5:
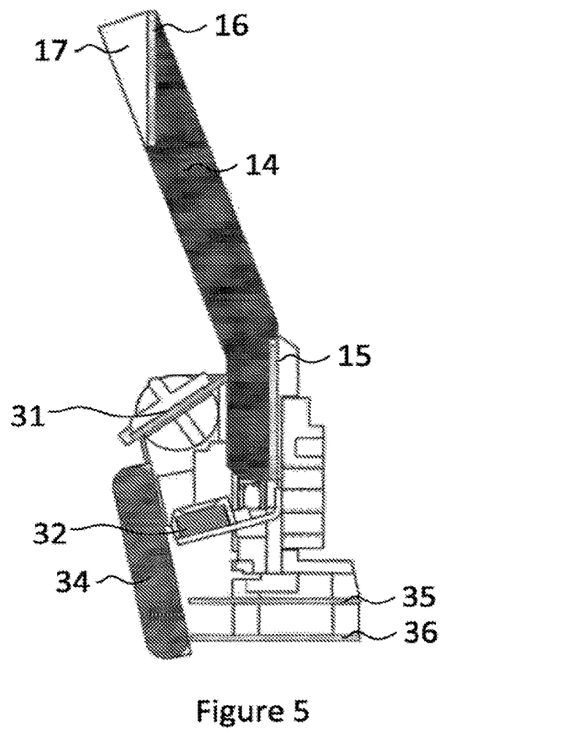
FIG. 5 shows a diagram of components internal to the enclosure.

FIG. 4 and FIG. 5 show a diagram of components internal to the enclosure 11. A display 32 is positioned in the lower part of the enclosure 11 and is responsible for generating the graphics to be shown on the HUD. The display 32 is preferably a LCOS device with pixels providing enough resolution for graphics such as icons and text to be generated.

Light emitted from the display needs to be coupled to an output hologram 16 positioned at the top of the enclosure 11. To couple light from the display 32 to the output hologram 16, an optical system is provided. The optical system includes a light guide 14, a reflective surface 31 such as a mirror, an input hologram 15. The internal region of the enclosure 11 includes a support 30 where the mirror is fixed. The internal region of the enclosure further includes a mount where the light guide 14 and input hologram 15 are supported to ensure stable alignment relative to other optical devices.

Figure 6:
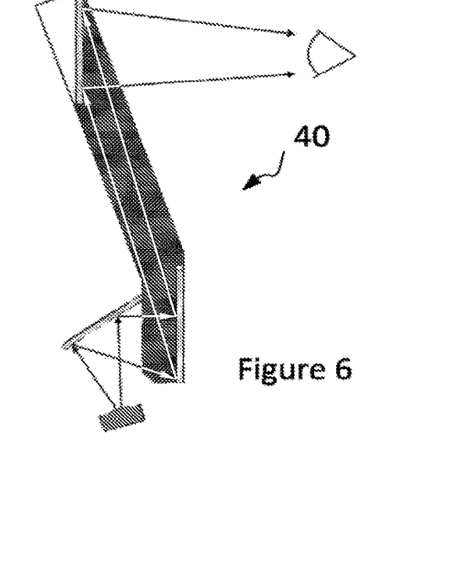
FIG. 6 more closely details the exemplary ray path of the folded optical system inside the enclosure.

To provide compact packaging of the optical system, light emitted from the display 32 is folded within the enclosure 11 and coupled into the light guide 14 for transmission to the output hologram 16. The output hologram 16 is a partially transparent surface that provides an augmented visual display when driven by the display screen 15 via light guide 14. FIG. 6 more closely details the exemplary ray path of the folded optical system 40. The display 32 is arranged to face vertically in the enclosure 11. A mirror is the reflective surface 31 is positioned to receive incident light from the display 32 and redirect that light to the input hologram 15. The input hologram 15 is positioned on the rear surface of the light guide 14 such that light with a somewhat perpendicular angle or incidence to the light guide 14 is redirected within the body of the light guide 14. Once light is coupled into the light guide 14, diffraction couples that light to the output hologram 16.

The enclosure 11 further supports a power source such as a battery and one or more circuit boards. In the embodiment depicted, a first PCB 35 and second PCB 36 are shown. The number and arrangement of circuit boards will depend on what electronics are desired within the enclosure and considerations such as interference between components. Two separate circuit boards provides the advantage of providing distance between noise generating components, heat dissipation and increases the area available circuit to support a circuit.

A Switch 37 functions to power the HUD on and off, and may optionally provide other functions such as turning communications systems on and off.

The light guide 14 is a transparent light guide ideally constructed from a clear substrate like glass, acrylic or polycarbonate having polished surfaces. The polished surfaces allow for total internal reflection once the light entered the substrate, "guiding" the light to the required point of view, where it hits the surface at an angle that allows it to leave the light guide. Light guides transport light on the same principle as fiber-optic cables, though careful design and attention to thickness and bending angles needs to be used, since the whole image is transported. When assembling light guides comprised of several parts assembled at angles to create a "bent waveguide", the bond between parts of the light guide 14 need to be as clear as possible, the surface angles ideally perpendicular to the light rays and the refractive index of used bonding adhesives closely matched to the waveguide's material. The light guide 14 comprising parts at angles to create the bent waveguide provide for a more compact assembly in some embodiments when compared to a straight light guide.

Holographic optical elements and diffractive optics are fixed to the surfaces of the light guide. It's an efficient way of transporting the light without the need for fragile fixtures holding HOEs positioned correctly in the path of the light. The refractive index and optic properties of the material are selected to shorten the required focal length for focusing the HUD image to a user's eye, therefore shortening the required light path length for certain focal lengths, which helps promote a more compact structure.

The light guide 14 guides the direction of light rays emitted from the input hologram 15 to the output hologram 16 using refraction and reflection to eventually reach the user's field of view at a desired angle and direction. The light guide 14 is segmented into regions of different angular projection. Internally, light is guided by refraction and reflection though these regions. The segmented regions in the light guide 14 allow the space required to present the display emitted light rays to the user to be reduced when compared to a straight optical element. Refraction within the optical element achieves a desired focus for a targeted eye relief and avoids the use of bulky optics.

The lower region of the light guide 14 is ideally a planar surface mirror. Light emitted from the display 32 hits the reflective surface 31 at an incident angle and is reflected at an outbound angle. Incident and outbound angle are congruent. Changes to the incident angle affects the outbound angle accordingly. When the angle of the planar surface mirror comprising the reflective surface 31 is adjusted and placed in the light's path, the resulting fold or redirection of the light can be precisely controlled and the beam directed to the next optical element.

For clear resulting images and efficient reflection, the reflective surface should be ideally flat (planar), reflect as much light as possible, be transparent and of neutral colour absorption. A recommended approach is to select a first surface mirror and experimenting with second surface mirrors. When using second surface mirrors, the resulting image quality was degraded and ghosting appeared. The rays in second surface mirrors are passing through a clear transparent substrate first, before being reflected from the second surface. The outbound light is partially reflected at the inner surface of the transparent layer, back to the reflective second surface where repeated total reflection occurs. This produces the ghost images in second surface mirrors, which poses challenges in image clarity and are a strong disadvantage over the chosen first surface mirrors. First surface mirrors are more scratch prone and the reflective surface can deteriorate due to exposure to harmful substances (oil residues, aggressive chemicals) and require careful handling and clean (ideally sterile) surroundings for assembly.

The light of the image to be displayed enters the light guide at the lower end at an angle that reduces reflection. The light passes through the thickness of the light guide, and hits the holographic diffractive optic, attached on the opposite side's surface. Then the light is redirected along the axis of the light guide through its entire length. Arriving at the upper end of the light guide, the light hits an angled surface with attached outcoupling holographic element 17, which determines the angle of the light projected out of the waveguide.

It should be noted that the optical system shown by FIG. 6, and particularly the folded optical system 40 has components and arrangement primarily dictated by the shaped and physical size of the enclosure relative to the size of the display screen. In some embodiments, a display screen may be utilised where that screen is small enough to avoid the requirement for mirrors to guide light into the light guide. In such embodiments, the display screen may be directly coupled into the light guide without the use of mirrors or folded optics.

First experiments were conducted using light guides assembled from several parts, bonded with optically transparent glue. These experiments showed that bonded multi part waveguides are prone to breaking, shifting, cracking and curing the adhesives poses risks of an improper cure process. Therefore, to overcome these challenges and improve the quality of the light guides, we shifted to a solid machined or cast light guide, which eliminated the need of bonding multiple parts together. A cast light guide reduces risk of breaking and improved image quality, resulting in a less fragile and less complex bent light guide.

Diffractive optical elements manipulate light beams by directing them through very narrow apertures or around corners. The result is a changed angle of the light's direction, polarity or circularity. Often interference of light waves occurs and is utilised to achieve the desired manipulation.

In alternative embodiments, the use of optics that propagate substantially in free space, such as lenses, apertures and mirrors, may achieve an HUD image or similar quality, however there is a limited ability to manipulate the light beam, the optical components are typically much larger, and the component count is significantly greater to create a from the display. Due to restrictions on size, weight and complexity, preferred embodiments use holographic optical elements to minimise the enclosure size, while providing the opportunity for better tuned image quality, the ability to reduce distortions and aberrations and lowering costs of optical elements.

The used diffractive elements comprise of thin film holograms with patterns modelled and calculated in computer software and shot by lasers in the modelled pattern.

There are two holographic optical elements are preferred. The first, in-coupling and focusing diffractive hologram at the bottom of the light guide. Its purpose is to redirect the light rays passing through the thickness of the light guide, hitting the HOE, into the light guide and along its axis. Through the created pattern in this HOE, the light will be redirected in specific angles depending on the incidence of the light ray. Therefore, the HOE acts as a 2-dimensional lens- and mirror array.

The second hologram is used at the top of the light guide, where the light is coupled-out of the light guide. This projects the virtual image into the eye of the viewer. This holographic element uses diffraction in the same manner as the bottom HOE, offering the same benefits as compared to conventional approaches and additionally allows surrounding light from behind the light guide to pass through, resulting in a transparent light guide and virtual image, superimposed in the field of view.

Therefore, the proposed heads-up display can be classified as augmented reality device, as it provides limited graphic overlays over the non-distorted, unaltered natural view of the surroundings.

After modelling the holographic patterns and shooting the holograms, noticeable distortions and colour degradation occurred in subsequent test. The efficiency was relatively low and coloured horizontal bands showed in the resulting virtual images. Distortions and colour degradation could be largely eliminated after fine tuning of the modelled patterns, very precise placement of the holograms and precise alignment of remaining optics. The efficiency improved when using lasers of a wavelength matching the spikes for red, green and blue parts of the light's spectrum. E.g. if highest luminance for blue light from the display occurs at 350 nm, then the wavelength of the laser used to shoot the blue portion in the pattern, should be closely matched. Ideally the blue laser light would be at 350 nm wavelength to maximize efficiency. The same applies to green and red lasers respectively.

Problems with colour banding and colour bias in the resulting virtual image were caused by extreme spikes in the red spectrum of the emitted light from the display. The luminance in this part of the red spectrum was multiples of the green and blue spectrum's luminance.

To even-out the spectrum there were two approaches possible. The first approach would be to produce a thin film colour filter to be applied on the display, reducing and lowering the intensity of the light in this part of the spectrum or blocking the spikes out completely. Another approach was to exchange the LEDs used in the display and therefore producing an even balanced light. The chemical composition of the LEDs determines the spectrum of the emitted light. Changing to LEDs of a different chemical composition gives us the desired light and no correction or filtering of the light, with resulting loss of efficiency is needed anymore.

Achieving high brightness of the HUD display is highly desirable, since the whole optical system needs to be bright enough to be readable in bright outdoor conditions, and avoid drawing excessive power from the power source. This poses a challenge for the display itself and the optical system's components. Choosing a high luminance display, considering space and energy consumption restrictions needs to be done carefully. A front-lit LCOS micro display has acceptable brightness, low power consumption and minimal space requirements. Due to its low power consumption, heat development is kept at a minimum and only minimal cooling is needed. The light spectrum of the LED used in this LCOS display is not optimal and poses challenges with the elements of the optical system. Exchanging the LED with a better suitable alternative with a more balanced spectrum of light, eliminates problems with colour banding, colour bias and dispersed light. Alternatively, a thin film filter allows to smoothen and balance the spectrum of emitted light, but reduces output and efficiency of the system.

In some embodiments, the display screen 32 is a coloured raster graphics display configured to allow information to be visualised in a manner definable by the operation of the pixels arranged as a grid in the display. The display screen allows fixed gauges to be avoided and provides for easily identifiable icons to be generated. The display screen also allows for the HUD in the field of view of the user to be completely cleared of information should that be desired.

Pixels can be controlled to form multiple icons and rearrange to highlight importance, colour can change for drawing attention. The display can be updated and improved easily through firmware upgrades. By way of comparison, fixed gauges can only display the data and ranges they're physically designed for. Rearranging an instrument cluster shown in the display is impossible or impractical. Physical indicators for all data points of interest need to be incorporated and take up space even when not active. Fixed graphics is inflexible and cannot be updated easily. Further, fixed graphics will fill the view with a lot of data and important information might not be noticed.

In contrast, using a raster graphics display allows for dynamically created graphics and icons, which show only the data necessary and raise alarms prominently. Updating the UI, rearranging icons and gauges is easily achievable.

A computing device is provided on one of the circuit boards and connected to the display 32. Where applicable, the computing device may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The system may be implemented on one or more computers. The computer includes a processor (otherwise referred to as a computing device and/or controller) connected by a data bus network to other components such as memory, a storage unit, a communication interface, the display 32.

A user input may be included to allow a user to input an action to the computing device, such as selecting keys from a keyboard, selecting one or more buttons or links. The signals from the user input devices are sent to the processor. Optionally, audio input/output components are included to allow, for example, voice commands and dictatorial input. In some embodiments, gesture control may be implemented, for example, gesture control may include swipe recognition (flick thumb across forefinger) that could be used, for example, to switch between HUD screens and select mode icons (by pressing/squeezing together thumb and forefinger). Gesture control is particularly useful for motorcyclists where the fingers of left hand are usually free except when 'clutching' or 'declutching'. Gesture control interfaces include wearable devices such as gesture control bands or rings; a handlebar mounted interface or touch sensitive fabrics integrated in the fingers of riders gloves.

The processor could be a microcontroller, digital signal processor (DSP), programmable logic controller (PLC), application specific integrated circuits or other processing component. The processor is configured to processes various signals, such as signals from the user interface. The processor may be configured to display information on the display. The processor is configured to execute computer-readable program instructions that are stored in data storage and are executable to provide desired processing functionality.

The computer device performs specific operations by processor and other components by executing one or more sequences of instructions to perform a function. In another example, the processor may be configured to interface with the communication interface, which in turn is capable of sending and receiving instructions via a network such as the internet. The desired functions of the processor may be contained as computer-readable instructions such as code. The code may be stored locally on a computer readable medium such as the storage device or sourced from a location external to the computer. A computer readable medium may refer to any medium that participates in providing instructions to processor for execution. Such a medium may take many forms, including but not limited to, non-volatile media, volatile media, and transmission media.

In various implementations, non-volatile media includes optical or magnetic disks, volatile media includes dynamic memory, such as system memory component, and transmission media includes coaxial cables, copper wire, and fibre optics. In one embodiment, the logic is encoded in non-transitory computer readable medium. In one example, transmission media may take the form of acoustic or light waves, such as those generated during radio wave, optical, and infrared data communications. Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

The processor is ideally configured to control the transmission of information with other devices. Other devices may include, for example, other computers, smart devices, servers or networks. The network may be wired, wireless, or a combination of both.

In various embodiments of the present disclosure, execution of instruction sequences to practice the present disclosure may be performed by computer system. In various other embodiments of the present disclosure, a plurality of computer systems coupled by communication link to a network (e.g., such as a LAN, WLAN, PTSN, and/or various other wired or wireless networks, including telecommunications, mobile, and cellular phone networks) may perform instruction sequences in coordination with one another.

Figure 7:
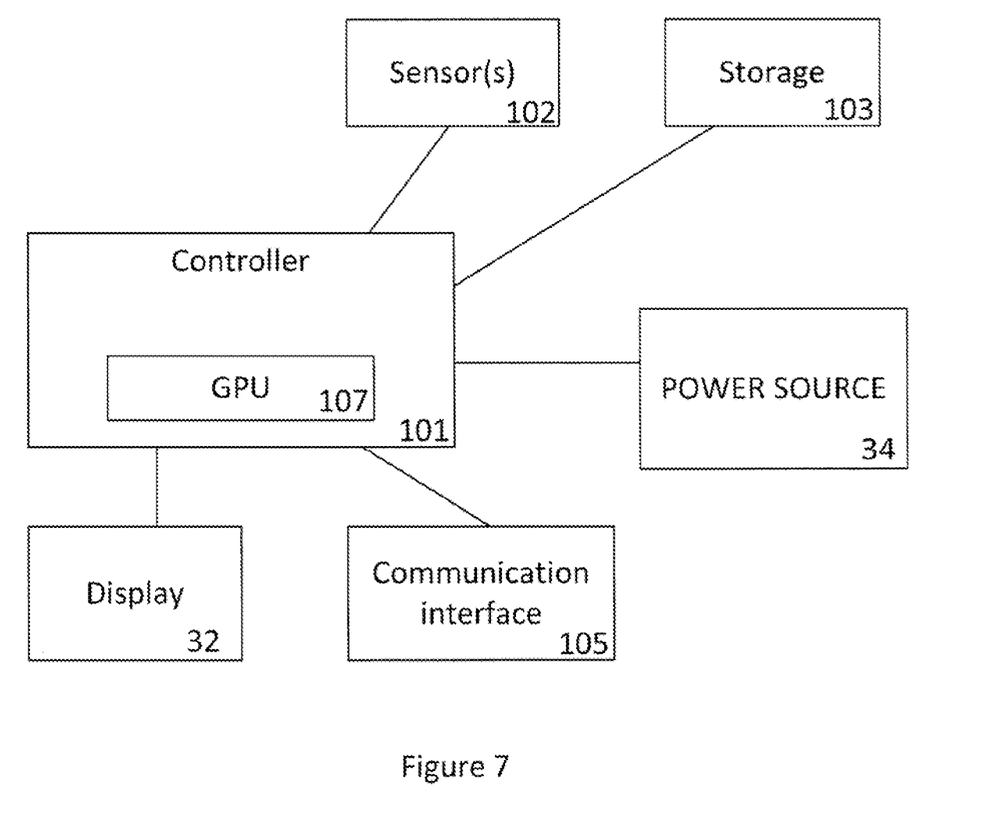
FIG. 7 illustrates an exemplary implementation of an electronics system embedded within a HUD enclosure.

FIG. 7 illustrates an exemplary implementation of an electronics system 100 embedded within the enclosure 11 according to a preferred embodiment, including exemplary informational inputs and outputs. In particular, the core of the electronics within the enclosure is a controller 101 linked to one or more sensors 102, storage 103, a communication interface 105 and the display 32.

The system is described in terms of functional block diagrams and various processing steps. It should be appreciated that such functional blocks may be realised in many different forms of hardware, firmware, and/or software components configured to perform the various functions. For example, the system may employ various integrated circuit components such as memory elements, digital signal processing elements, look-up tables, and the like, which may carry out a variety of functions under the control of one or more microprocessors or other control devices.

The controller 101 may include or be implemented by any number of processor elements such as microprocessors and central processing units, memory elements, power supplies, and other functional components as necessary such as a graphical processing unit (GPU) 107 to support the operation of a display. In this respect, processor may include or cooperate with any number of software programs or instructions designed to carry out various methods, process tasks, calculations, control functions, and the generation of display signals and other data used by display.

The controller 101 is preferably supported by a storage device 103 accessed locally or remotely. The storage unit 103 may be used to store machine readable instructions that are provided to the controller for execution. The storage unit may also include memory acting in support of the controller operation.

One or more sensors 102 are connected to the controller 101 by a wired or wireless interface.

The system 100 further includes a communication interface device 105, such as a wireless interface for connection to a network, such as the Internet or an intranet. The communication interface 105 may be used to facilitate communication between the controller and the one or more sensors 102, and further facilitate communication with the one or more display devices 32.

The power source 34 is connected to the controller 101 and other active devices as required. The power source may be a battery such as a lithium ion cell and in some embodiments may be supplemented by a renewable energy source such as solar or wind energy generation.

Figure 8:
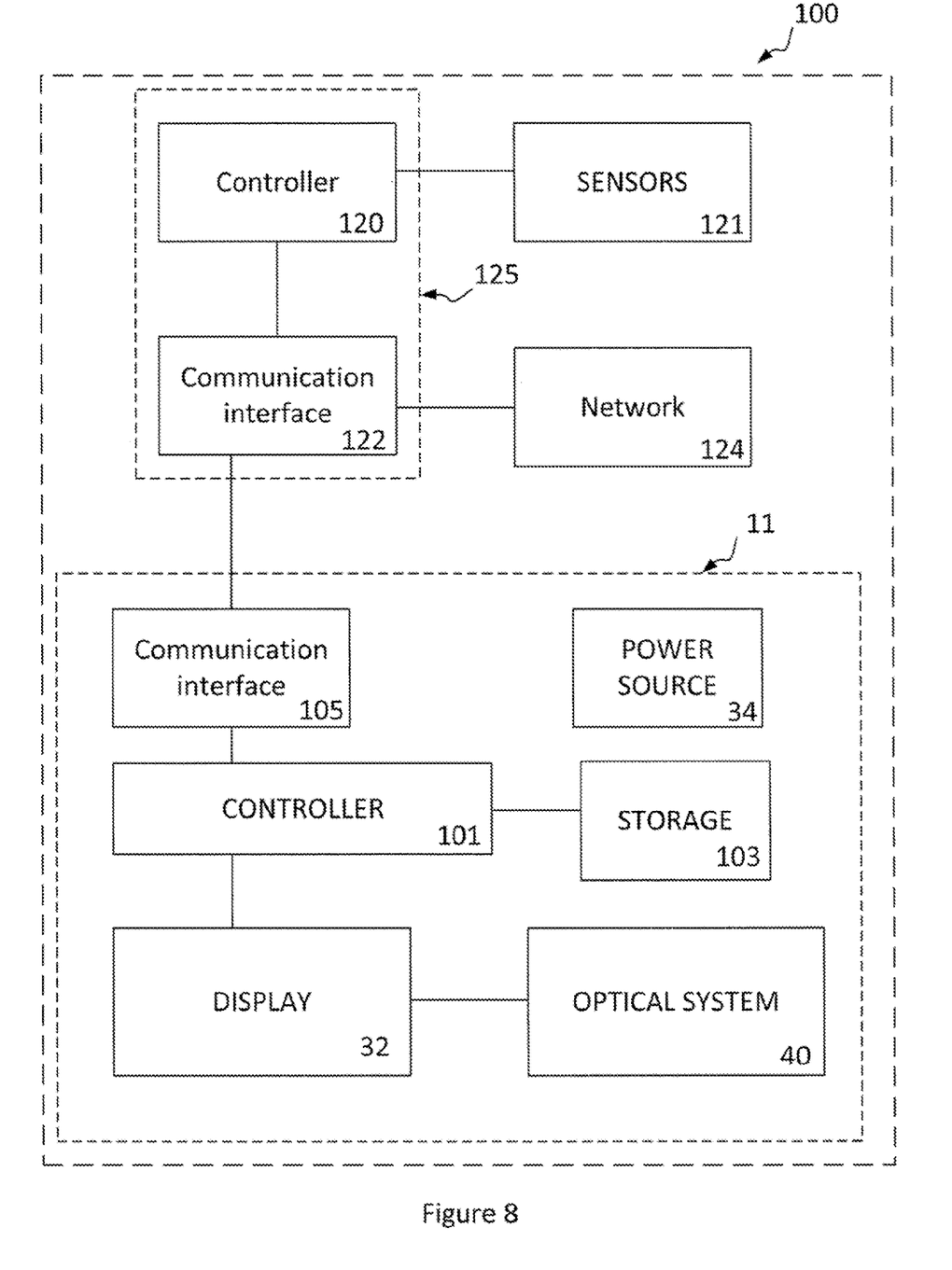
FIG. 8 shows a diagram of components in a particular exemplary embodiment of an HUD system.

FIG. 8 shows a particular exemplary embodiment of an HUD system 100. The system incorporates an enclosure 11 as described in detail above. The enclosure 11 contains a controller 101 that is configured to drive a display 32, to communicate with a storage media 103 and a communication interface 105. The display 32 is arranged to output to a geometrical optical system such as the arrangement detailed with reference to FIGS. 4 to 6.

The output of the optical system is a display that presents visual information to a user. The visual information for presentation to the user is received from sensors and other information sources located outside of the enclosure 11. To communicate this data to the controller 101, the communication interface 105 in the enclosure is configured to receive data from an external data source 125. In the exemplary embodiment depicted, the external source is provided by a portable computing device such as a smartphone, laptop or tablet.

The external data source 125 has a controller 120 configured to operate a communications interface 122. Optionally, the external data source 125 is connected to one or more sensors 121 and optionally a network 125 that may include the internet, a local wired interface such as CANBUS, and/or a cluster of other devices capable of wireless communication.

Applicable sensors 121 may include a gyroscope, accelerometer, camera, light intensity sensor, global positioning sensors, revolutions sensors, gear shift, lean angle sensor, lights and turn indicators, tire pressure sensors or temperature sensors.

In some embodiments the controller 101 is a Graphics Processing Unit (GPU) configured to interface with memory storage 103 which contains a library of predetermined set of graphics for display.

Use of a library stored within the enclosure provides several advantages which will now be explained. The enclosure is mounted remotely from other devices and powered by a limited source of power such as a battery. Generating a bright visual display that is readable in sunlight requires the output intensity of the display 32 to be high, thus placing a demand on the battery. To minimise power draw from the battery, the communication interface 105 should draw as little power as possible.

In some embodiments, the communication interface 105 is a low power Bluetooth transceiver. Running the communication interface 105 at low power introduces problems such as low range and a high susceptibility to environmental noise. To maximise the potential for successful data transmission, the data sent between the HUD system 11 and the external data source 125 should be kept to a minimum.

To facilitate minimal wireless data transmission, the GPU has available a library of characters and symbols stored in the storage device 103. The controller 120 of the external data source needs send only a reference to a desired character or symbol to the HUD controller 101. The HUD controller 101 then retrieves the reference from the library and an associated pixel data set to be generated. The GPU responds to commands it receives wirelessly, processes the commands translating into graphics comprised of pixels and then activates the pixels in the raster graphics display to emit or reflect light in the colour requested. This process speeds up processing and minimize the instructions transmitted, instead of getting instructions pixel by pixel.

Moving the processing and communication functions to an external portable computing device allows for longer battery life, upgradability through software updates, extensibility through new implemented function in the software and omits the need to use additional error prone, heavy, power consuming hardware.

A consumer can add components to customise and extend their HUD's capabilities on a needs basis, component by component, when they can afford it, instead of buying an expensive all-in-one HUD with functionality not or rarely needed with much higher up-front costs. The modular system allows the user to take it to and share it across several helmets, instead of having to replace the whole HUD system with every new helmet or buying several HUD systems— one in each helmet.

In an exemplary embodiment, the HUD system has display driver electronics with GPU, frame buffer, registers for internal functions, the Bluetooth Low Energy module, battery control and charging elements, switches to interact with the HUD (turn-on and off, enable pairing mode), ports for internal sensors to send data via serial bus to Bluetooth module, which relays to smartphone.

The smartphone connects wirelessly using the Bluetooth Low Energy protocols implemented in the smartphones to send data as bits through the serial programming interface. These bits are received by the BT module and transparently relayed to the serial data bus connecting the sensors and GPU. The GPU receives and interprets the bits receives and triggers pre-programmed functions stored in the registers.

The GPU executes the appropriate functions and sends signals (frames) to the frame buffer. The frame buffer sends signals in certain intervals to the display control chip which translates to electric currents to be sent to the display's pixels to activate or change their state.

Sensors experience external influences and translate these into electrical currents or state changes. These are digitised into bit signals and send with description of the sending channel or component onto the SPI bus.

The BT module receives these broadcasts on its receiving serial bus and relays them transparently to the smartphone. Sensors and the GPU broadcast their data without a certain recipient onto the serial data bus, allowing several components to receive, interpret and act on the received signals.

The battery control module has its own independent circuitry and acts as a sensor and controller. Therefore, the battery health and charge level can be accessed as sensor data and charging of the battery can be controlled via commands.

A brightness sensor delivers data about the surrounding light conditions, which can be used by the app to instruct the display to dim its brightness. For embodiments employing an electrochromatic controllable wind shield, surrounding light conditions may be used to control the opacity of the windshield to optimise visibility.

Spatial sensors deliver data which can used for performance analysis and crash detection.

The above described HUD is generally configured for display of a data retrieved from a number of sensors. The control device incorporated into HUD enclosure does not interface directly to all sensors. Instead, a portable computing device provides an interface for receiving signals output by the sensors, and translates those signals into data for transmission to the HUD device.

The portable computing device is primarily responsible for receiving sensor data from sensors in built-in electronics, and sending and receiving commands and data to and from other optional sensors and devices. The portable computing device also run application software, provides gyroscope, accelerator and GPS geo spatial data to the application software. Further, the portable computing device may be configured to provide turn-by-turn navigation, social features, location tracking, user messaging and status updates. Functions as user interface to the social community, navigation features and route planning. Acts as communications and processing hub that connects all devices, sends and retrieves data from the API server in the cloud through wireless data connection. Sends requests to and receives navigation instructions to routing API providers. Interprets the navigation instructions and translates them into HUD compatible commands. Uses gyroscope data to determine spatial alignment when mounted on the bike. Uses acceleration data to determine crashes or unusual motion events. Uses GPS data for geospatial location determination and location aware services.

Additional sensor modules are optional and provide additional sensor data for future integration into the functionality of the application software. Connection to the portable computing device can be through BT connection or wired connection to the HUD. Receive requests and commands and offer respective sensor data.

The optional physical interface for wired connection to a vehicle data network is attached to the vehicle's databus (CANBUS) available on many vehicles. The physical interface can listen to the data on the bus system, interpret, record and relay these to the processing unit to extract and process information. The physical interface can also send data and commands onto the bus system, to provide data and issue commands to board network components and change settings. Voice commands can also be used to interface and issue commands to select appropriate vehicle settings to suit the road and environment conditions 'on the fly'.

To minimise consumption of power from the power source provided in the HUD enclosure, and power consumed by the portable computing device, it is desirable to use a low power data transmitter. To improve the level of successful data transmission from the portable computing device to the HUD device, it is desirable to minimise the data required for transmission. The HUD device has a predetermined set of data relating to generating graphics to show a particular icon or image on the HUD display. The graphics processing unit in the HUD stores data operable to generate that image when sent to the display. Each graphical element for display on the HUD has an identification code associated with it which may be one or two characters or digits. To enable display of that graphical element, the portable computing device operates to only send the identification code to the graphics processing unit in the HUD. Sending a simple data set in this way minimises the power consumption from the power sources of the HUD device and the portable computing device. In some exemplary embodiments, the portable computing device connects to the HUD device using BT and sends commands to display shapes as defined by the library of reference icons, characters and symbols.

The database server receives data from the API server, stores and manages, and delivers data stored in the database to the API server. It is an essential component of the backend for storing user account information, credentials, route information, locations, etc. The database server is not directly accessible and can only be queried by the API server.

The Application Programming Interface server or API server offers interfaces to methods, to query the database on the database server. It receives requests to store and retrieve data from the database server and replies with data related to the requests, either delivering the requested information or acknowledging non-existence of requested information. It will also alert the requesting entity of misformatted queries. As security measure, to restrict access, the API server uses secret API keys and/or certificates to authenticate and authorise the requesting entities.

The Web Application server, which may also be the API server, hosts a web application with similar functionality as the app. The functionality offer is lacking the mobile features of the app, but offers a more convenient and granular way of setting-up user accounts, customise user and group profiles, plan and store routes, track users' location if permitted. The Web Application server sends requests to query the database to API server including API keys and/or certificates to authenticate and authorise the request. The API server queries the database as a proxy and relays the results to the Web Application server.

The optional processing unit and network communication hub works as a substitute or addition for the portable computing device. It offers the processing capabilities and a central data routing and connection point in the network, connects to its components, receive data, processed the data and send data and commands to the HUD. When used as substitute for the smartphone app, functionality and display options differ from when the smartphone is used. Some functionality like turn-by-turn routing, social features and many functions relying on a UI are limited.

Such general techniques are known to those skilled in the art and are not described in detail herein. Moreover, it should be understood that the exemplary process illustrated may include additional or fewer steps or may be performed in the context of a larger processing scheme. Furthermore, the various methods presented in the drawing Figures or the specification are not to be construed as limiting the order in which the individual processing steps may be performed.

It should be apparent, however, to those skilled in the art that many more modifications besides those already described are possible without departing from the inventive concepts herein. The inventive subject matter, therefore, is not to be restricted except in the spirit of the disclosure.

Where in the foregoing description reference has been made to elements or integers having known equivalents, then such equivalents are included as if they were individually set forth. Although the invention has been described by way of example and with reference to particular embodiments, it is to be understood that modifications and/or improvements may be made without departing from the scope or spirit of the invention.

The invention claimed is:

1. A device for displaying an image on a device external to a helmet, the system comprising:
    an enclosure adapted to be coupled to the helmet;
    a graphics processing unit fitted within the enclosure;
    a communications device fitted within the enclosure;
    an optical system partially housed within the enclosure and comprising:
    a display that is capable of forming an image according to image data content from the graphics processing unit;
    a light guide comprising:
    an input surface, contained within the enclosure and disposed to receive image-bearing light from the display;
    a first light-redirecting element in optical communication with the input surface and adapted to redirect the image-bearing light for transmission within the light guide;
    an output surface, extending outside the enclosure and disposed to receive the image-bearing light transmitted from the first light redirecting element on the input surface;
    a second light-redirecting element coupled to the output surface and adapted to redirect the image-bearing light outward from the light guide;
    an intermediate segment of the light guide that defines a light path leading away and extending from the input to the output surface; and
    one or more sensors each configured to provide an output signal to a portable computing device according to a sensed condition.

2. The device as claimed in claim 1, wherein the graphics processing unit further comprises a storage unit, wherein the storage unit stores a plurality of predefined images, wherein each image has associated image pixel data content and an associated identification code that corresponds to a memory location in the storage unit.

3. The device as claimed in claim 1, wherein the portable computing device is configured to generate a memory address associated with the output signals received from the one or more sensors.

4. The device of claim 1 wherein the portable computing device is configured for wireless signal communication.

5. The system of claim 4 wherein the memory address requires less data storage than does the corresponding image data.

6. The system of claim 2 wherein, for each identification code, the identification code uses less data than the associated image pixel data content.

7. The system of claim 4 wherein the image is an icon that relates to motor vehicle navigation.

8. The system of claim 1 further comprising a releasable coupling that has a fastening surface and a resilient joint located between the fastening surface and the enclosure.

9. The device of claim 1 wherein the first and second light-redirecting elements are holographic optical elements.

10. The device of claim 1 further comprising a light intensity sensor configured to output a signal indicative of ambient light level.

11. A device for displaying an image on a device external to a helmet, the system comprising:
    an enclosure adapted to be coupled to the helmet;
    a graphics processing unit fitted within the enclosure;
    a communications device fitted within the enclosure; and
    an optical system partially housed within the enclosure and comprising:
    a display that is capable of forming an image according to image data content from the graphics processing unit; and
    a light guide comprising:
    a plurality of light-redirecting elements in optical communication with an input surface contained within the enclosure and adapted to redirect image-bearing light for transmission by the plurality of light-redirecting elements to an output surface adapted to redirect the image-bearing light outward from the light guide.

12. The device as set forth in claim 11 wherein the one or more light redirecting elements further comprise:
    a first light-redirecting element in optical communication with the input surface and adapted to redirect the image-bearing light for transmission within the light guide; and
    a second light-redirecting element coupled to the output surface and adapted to redirect the image-bearing light outward from the light guide.

13. A device for displaying an image on a device external to a helmet, the system comprising:
    an enclosure adapted to be coupled to the helmet;
    a graphics processing unit fitted within the enclosure;
    a communications device fitted within the enclosure; and
    an optical system partially housed within the enclosure and comprising:
    a display that is capable of forming an image according to image data content from the graphics processing unit; and
    a light guide having comprising:
    an input surface, contained within the enclosure and disposed to receive image-bearing light from the display;
    a first light-redirecting element in optical communication with the input surface and adapted to redirect the image-bearing light for transmission within the light guide;

an output surface, extending outside the enclosure and disposed to receive the image-bearing light transmitted from the first light redirecting element on the input surface;

a second light-redirecting element coupled to the output surface and adapted to redirect the image-bearing light outward from the light guide;

an intermediate segment of the light guide that defines a light path leading away and extending from the input to the output surface.

14. The device as claimed in claim 13, wherein the enclosure further comprises a releasable coupling mechanism adapted to releasable couple to the helmet, the mechanism having a fastening surface disposed for contact against a helmet surface and a resilient joint disposed to extend the enclosure from the fastening surface.

15. The device as claimed in claim 13, wherein the graphics processing unit further comprises a storage unit, wherein the storage unit stores a plurality of predefined images, wherein each of the images has associated image pixel data content and an associated identification code.

16. The device as claimed in claim 15, wherein the associated image pixel data content represents a predefined set of alphanumeric characters and graphical symbols.

17. The device as claimed in claim 15 wherein the graphics processing unit further comprises a controller that is configured to execute stored, encoded instructions to:

receive a signal representative of an identification code;

retrieve the image data content corresponding to the identification code from the storage unit;

and transmit the retrieved image data to the display.

18. The device as claimed in claim 15, wherein the communications device is configured to wirelessly transmit and/or receive at least an identification code from a portable computing device.

19. The device of claim 13 wherein the first and second light-redirecting elements are holographic optical elements.

20. The device of claim 13 further comprising a windshield having an electrochromatic material for variable opacity.

21. The device of claim 20 further comprising a light intensity sensor configured to output a signal indicative of ambient light levels for windshield opacity control.

* * * * *